United States Patent
Ashizawa

(10) Patent No.: US 8,035,906 B2
(45) Date of Patent: Oct. 11, 2011

(54) VIBRATION ACTUATOR, LENS BARREL AND CAMERA

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/448,368

(22) PCT Filed: Dec. 20, 2007

(86) PCT No.: PCT/JP2007/074494
§ 371 (c)(1),
(2), (4) Date: Jan. 22, 2010

(87) PCT Pub. No.: WO2008/078640
PCT Pub. Date: Jul. 3, 2008

(65) Prior Publication Data
US 2010/0142064 A1 Jun. 10, 2010

(30) Foreign Application Priority Data

Dec. 25, 2006 (JP) ................................ 2006-347257

(51) Int. Cl.
*G02B 7/02* (2006.01)
*G02B 15/02* (2006.01)
(52) U.S. Cl. ........................ 359/824; 359/696
(58) Field of Classification Search .......... 359/694–824; 310/323.01–32, 323.01–323.06
See application file for complete search history.

(56) References Cited

U.S. PATENT DOCUMENTS

| 5,854,529 A * | 12/1998 | Ashizawa et al. ........ 310/323.01 |
| 7,528,509 B2 * | 5/2009 | Ueda et al. ................... 310/15 |
| 7,529,381 B2 * | 5/2009 | Kaneda et al. ................ 381/403 |
| 7,732,980 B2 * | 6/2010 | Morioke .................... 310/323.06 |

FOREIGN PATENT DOCUMENTS

| JP | A-11-289781 | 10/1999 |
| JP | A-2001-157473 | 6/2001 |
| JP | A-2004-297869 | 10/2004 |
| JP | A-2006-087195 | 3/2006 |

OTHER PUBLICATIONS

International Search Report issued in International Application No. PCT/JP2007/074494; Mailed on Feb. 12, 2008.
May 24, 2011 Office Action issued in Chinese Patent Application No. 200780047963.5.

* cited by examiner

*Primary Examiner* — Mohammed Hasan
(74) *Attorney, Agent, or Firm* — Oliff & Berridge, PLC

(57) ABSTRACT

A vibration actuator comprising: an electromechanical conversion element excited by a driving signal; an elastic body to which the conversion element is jointed and on a driving face of which vibration waves are generated by the excitation; and a relative moving element pressure-contacted with the driving face of the elastic body, and which is driven by the vibration waves, and wherein: a joining face of the conversion element which is joined to the elastic body has an electrode portion, and a joining strength improving portion which improves the joining strength between the elastic body and the conversion element; and the electrode portion is formed on at least one of two edge portions of the joining face, through the edge portions, an imaginary straight line pass, the line pass the improving portion and is orthogonal to a relative moving direction of the elastic body and the moving element.

9 Claims, 10 Drawing Sheets

VIBRATION ACTUATOR, LENS BARREL AND CAMERA

TECHNICAL FIELD

The present invention relates to a vibration actuator, and a lens barrel and camera provided with the same.

BACKGROUND ART

In vibration actuators, progressive vibration waves (hereafter, called progressive waves) are generated on a driving face of an elastic body using the expansion and contraction of an electromechanical conversion element, elliptic motion is generated at the driving face by these progressive waves, and a relative moving element in pressure-contact with the wave crests of the elliptic movement is driven.

Much consideration has been given to improving the driving efficiency and driving performance of such vibration actuators, and as one example, Patent Document 1 discloses a vibration actuator where the width w in the radial direction of the electrode portion of the piezoelectric body is provided to be wider than the width in the radial direction of the flexural center of the elastic body.

However, in the method disclosed in Patent Document 1, there is the problem that the vibration actuator becomes large.
Patent Document 1: Japanese Unexamined Patent Publication No. 2004-297869.

DISCLOSURE OF THE INVENTION

Problems to be Solved by the Invention

The problem to be solved by the present invention is to make possible the miniaturization of an actuation vibrating element.

Means for Solving the Problems

The present invention solves the above problem by the means described below. Further, in order to facilitate understanding, an explanation is given with reference numbers corresponding to the embodiments of the present invention, but these are not limitations.

An invention according to the claim 1 is a vibration actuator (10) comprising: an electromechanical conversion element (13) which is excited by a driving signal; an elastic body (12) to which the electromechanical conversion element is jointed and on a driving face of which vibration waves are generated by the excitation; and a relative moving element (15) which is pressure-contacted with the driving face of the elastic body, and which is driven by the vibration waves, and wherein: a joining face (13a) of the electromechanical conversion element which is joined to the elastic body has an electrode portion (131, A1-A4, B1-B4) where an electrode is formed, and a joining strength improving portion (133) which improves the joining strength between the elastic body and the electromechanical conversion element; and the electrode portion is formed on at least one of two edge portions of the joining face, through the edge portions, an imaginary straight line (L) pass, the line pass the joining strength improving portion and is orthogonal to a relative moving direction of the elastic body and the relative moving element.

An invention according to the claim 2 is the vibration actuator (10) according to claim 1, wherein: the joining strength improving portion (133) is formed at different positions with respect to the relative moving direction on the two edge portions and/or in the vicinity of the two edge portions.

An invention according to the claim 3 is the vibration actuator (10) according to claim 1 or claim 2, wherein: the joining strength improving portion (133) has a measurement in the direction of relative movement which is longer than a measurement in a direction along the imaginary straight line.

An invention according to the claim 4 is the vibration actuator (10) according to any one of claims 1 to 3, wherein: the joining strength improving portion (133) is formed on the other of the two edge portions of the joining face through which the imaginary straight line (L) passes.

An invention according to the claim 5 is a vibration actuator (10) according to any one of claims 1 to 3, wherein: the joining strength improving portion (133) is randomly positioned on the joining face.

An invention according to the claim 6 is the vibration actuator (10) according to any one of claims 1 to 5, wherein: the electrode portion is formed at a section facing the joining strength improving portion on a face on an opposite side of the joining face of the electromechanical conversion element.

An invention according to the claim 7 is the vibration actuator (10) according to any one of claims 1 to 6, wherein: the electrode portion (131, A1-A4, B1-B4) is not formed, and a substrate of the electromechanical conversion element (13) is exposed on the joining strength improving portion (133).

An invention according to the claim 8 is a lens barrel (3) provided with the vibration actuator (10) according to any one of claims 1 to 7.

An invention according to the claim 9 is a camera (1) provided with the vibration actuator (10) according to any one of claims 1 to 7.

Effects of the Invention

By means of the present invention, a vibration actuator can be miniaturized.

EXPLANATIONS OF NUMERALS

12: Elastic body, 13,23,33,43: Piezoelectric body, 15: Moving element, 133: Joining strength improving portion

PREFERRED MODE FOR CARRYING OUT THE INVENTION

Below, a more detailed explanation is given with reference to the drawings, presenting embodiments of the present invention. The following embodiments are explained presenting an ultrasonic wave motor as an example of the vibration actuator.

First Embodiment

Figure 1:
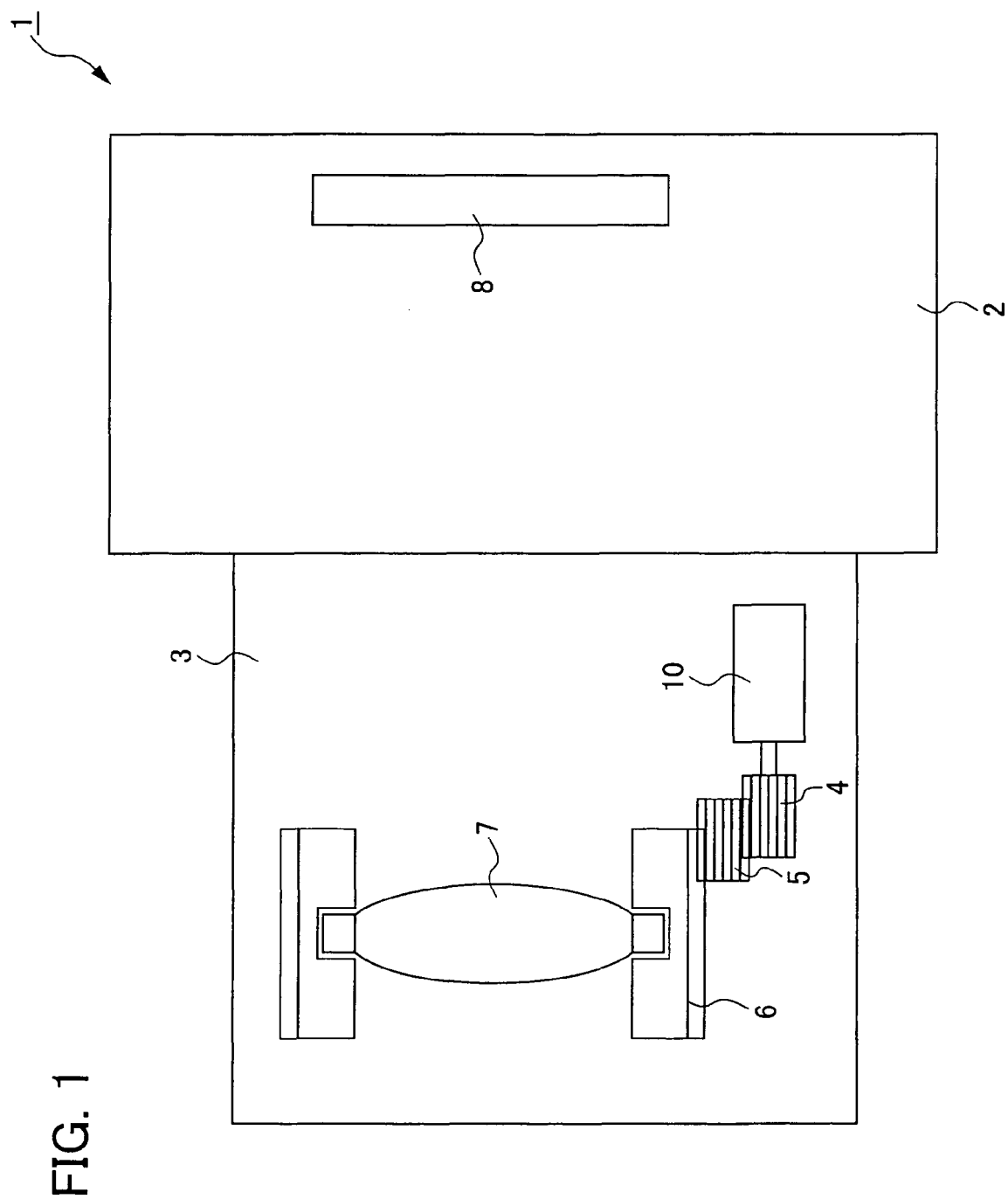
FIG. 1 is a drawing explaining the camera 1 of the first embodiment.

FIG. 1 is a drawing explaining the camera 1 of the first embodiment.

The camera 1 of the first embodiment is provided with a camera body 2 having an image pickup device 8, and a lens barrel 3 having a lens 7.

The lens barrel 3 is an interchangeable lens which can be attached to and removed from the camera body 2. Further, in the present embodiment, an interchangeable lens is shown as an example of the lens barrel 3, but this is not a limitation and for example, it can also be a lens barrel integrated with the camera body.

The lens barrel 3 is provided with the lens 7, cam tube 6, gears 4 and 5, ultrasonic wave motor 10, and the like. In the present embodiment, the ultrasonic wave motor 10 is used as a driving source for driving the lens 7 during the focusing operation of the camera 1, and the driving force obtained from the ultrasonic wave motor 10 is transmitted to the cam tube 6 via the gears 4 and 5. The lens 7 is held by the cam tube 6, and is a focusing lens which adjusts the focal point by moving along the optical axis direction by the driving force of the ultrasonic wave motor 10.

In FIG. 1, an object image is formed on the imaging surface of the image pickup device 8 by the lens group (including the lens 7), not shown in the drawing, provided in the lens barrel 3. The formed object image is converted to an electric signal by the image pickup device 8, and by A/D conversion of this electric signal, the image data is obtained.

Figure 2:
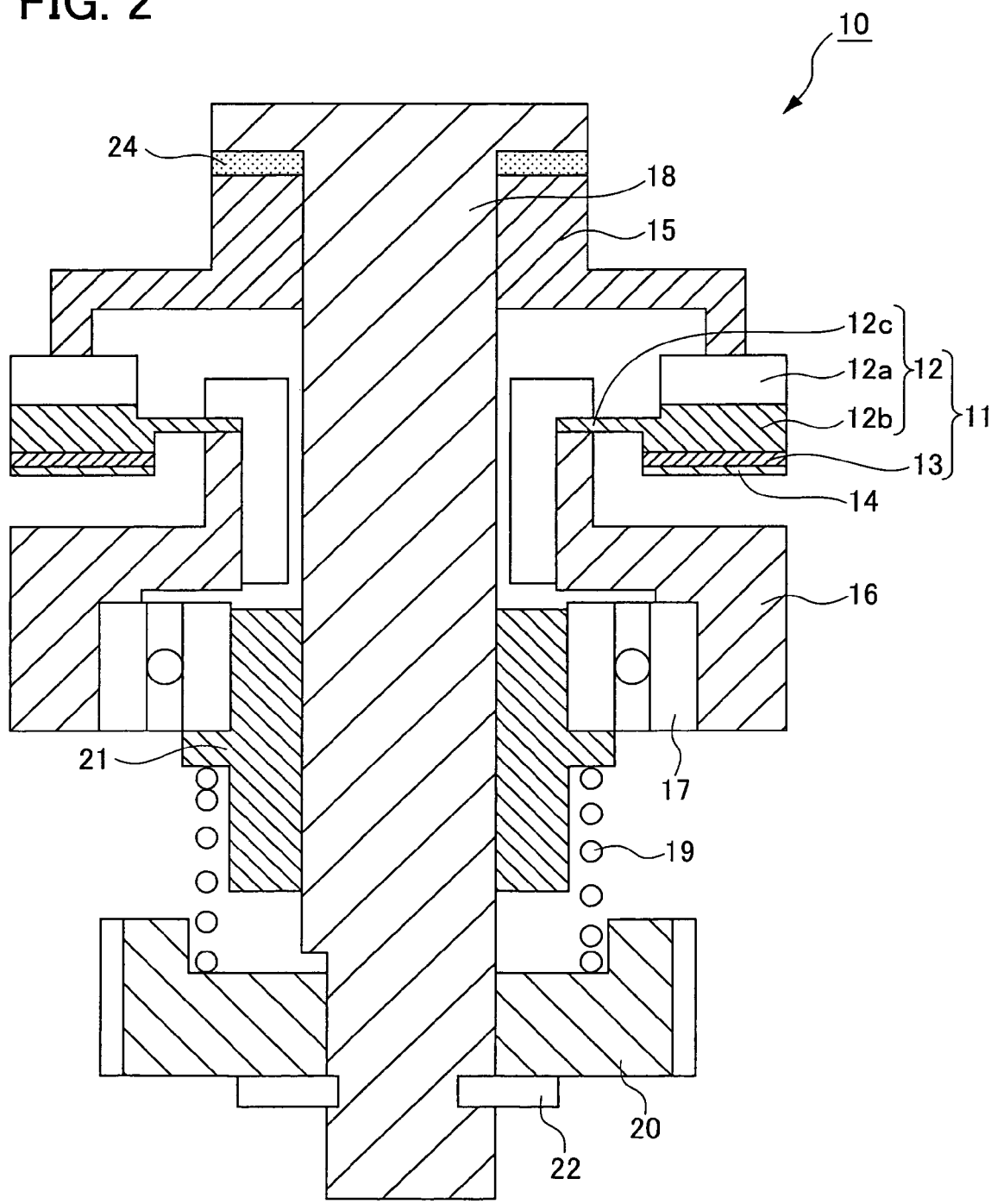
FIG. 2 is a cross sectional drawing of the ultrasonic wave motor 10 of the first embodiment.

FIG. 2 is a cross sectional drawing of the ultrasonic wave motor 10 of the first embodiment.

The ultrasonic wave motor 10 of the first embodiment is provided with the vibrating element 11, moving element 15, output shaft 18, pressurizing member 19 and the like, and is formed such that the vibrating element 11 side is fixed, and rotationally drives the moving element 15.

The vibrating element 11 is a member having a substantially toric form, comprising the elastic body 12, and the piezoelectric body 13 joined to the elastic body 12.

The elastic body 12 is formed of a metal material having a large degree of resonance acuteness, and its form is substantially toric. This elastic body 12 has a comb tooth section 12a, a base section 12b, ad a flange section 12c.

The comb tooth section 12a is formed with a plurality of cut grooves on the face on the opposite side of the face joined to the piezoelectric body 13, and the tip faces of this comb tooth section 12a pressure-contact the moving element 15, and form the driving face which drives the moving element 15. A lubricant surface treatment such as Ni—P (nickel-phosphorus) plating or the like is applied to this driving face. The reason for providing the comb tooth section 12a is to bring the neutral plane of the progressive waves arising on the driving face by the expansion and contraction of the piezoelectric body 13 as close as possible to the piezoelectric body 13 side, to thereby amplify the amplitude of the progressive waves of the driving surface.

The base section 12b is a section which is continuous in the peripheral direction of the elastic body 12, and the piezoelectric body 13 is joined to the face of the base section 12b on the opposite side of the comb tooth section 12a.

The flange section 12c is brim-shaped section which projects in the inner radial direction of the elastic body 12, and is positioned in the center of the thickness direction of the base section 12b. The vibrating element 11 is fixed to the fixed member 16 by this flange section 12c.

The piezoelectric body 13 is an electromechanical conversion element which converts electric energy into mechanical energy, and for example, a piezoelectric element or electrostrictive element can be used. The piezoelectric body 13 is a member having an substantially toric shape, and is divided into regions along the peripheral direction of the elastic body 12 to which electric signals of two phases (A phase and B phase) are input (refer to FIG. 4B). For each phase, elements for which the polarization alternates every ½ wavelength are arranged, and an interval of ¼ wavelength is provided between the A phase and the B phase. This piezoelectric body 13 is joined to the elastic body 12 using an adhesive.

A flexible printed circuit board 14 has wiring connected to electrodes of each phase of the piezoelectric body 13, and the piezoelectric body 13 is expanded and contracted by a driving signal provided to the flexible printed circuit board 14 from the later-described amplification sections 104 and 105.

For the vibrating element 11, progressive waves are generated at the driving face of the elastic body 12 by the expansion and contraction of the piezoelectric body 13. In the present embodiment, a four wave progressive wave is generated.

The moving element 15 is formed of a light metal such as aluminum or the like, and is a member which is rotationally driven by the progressive waves generated at the driving face of the elastic body 12. A surface treatment such as alumite or the like, for improving the abrasion resistance, is applied to the moving element 15, at the surface of its face which contacts the vibrating element 11 (the driving face of the elastic body 12).

The output shaft 18 is member of an approximately cylindrical form. One end of the output shaft 18 adjoins the moving element 15 via the rubber member 24 so that the output shaft 18 is integrally rotate with the moving element 15.

The rubber member 24 is a member which has a substantially toric shape and is formed of rubber. This rubber member 24 has the function of making it possible for the moving element 15 and the output shaft 18 to integrally rotate due to the viscoelasticity of the rubber, and also has the function of absorbing vibrations so that the vibrations from the moving element 15 are not transmitted to the output shaft 18, and is made using butyl rubber, silicone rubber, propylene rubber, and the like.

The pressurizing member 19 is a member which generates an applied pressure to pressure-contact the vibrating element 11 and the moving element 15, and is disposed between the gear member 20 and the bearing receiving member 21. In the present embodiment, as the pressurizing member 19, a compression coil spring is used, but it is not limited to this.

The gear member 20 is inserted so as to fit into a D-cut of the output shaft 18 and is fixed with a stopper 22 such as an E-ring or the like, and is disposed to be integral with the output shaft 18 in the rotation direction and the axial direction. The gear member 20, by rotating with the rotation of the output shaft 18, transmits driving power to the gear 4 (refer to FIG. 1).

Further, the bearing receiving member 21 is positioned at the inner radial side of the bearing 17, and the bearing 17 is constituted to be positioned at the inner radial side of the fixed member 16.

The pressurizing member 19 presses the vibrating element 11 towards the moving element 15 in the axial direction of the output shaft 18, and the moving element 15 pressure-contacts the driving face of the vibrating element 11 by this pressure, and is rotationally driven. Further, the applied pressure adjusting washer is disposed between the pressurizing member 19 and the bearing receiving member 21, so as to provide a suitable applied pressure for the driving of the ultrasonic wave motor 10.

Figure 3:
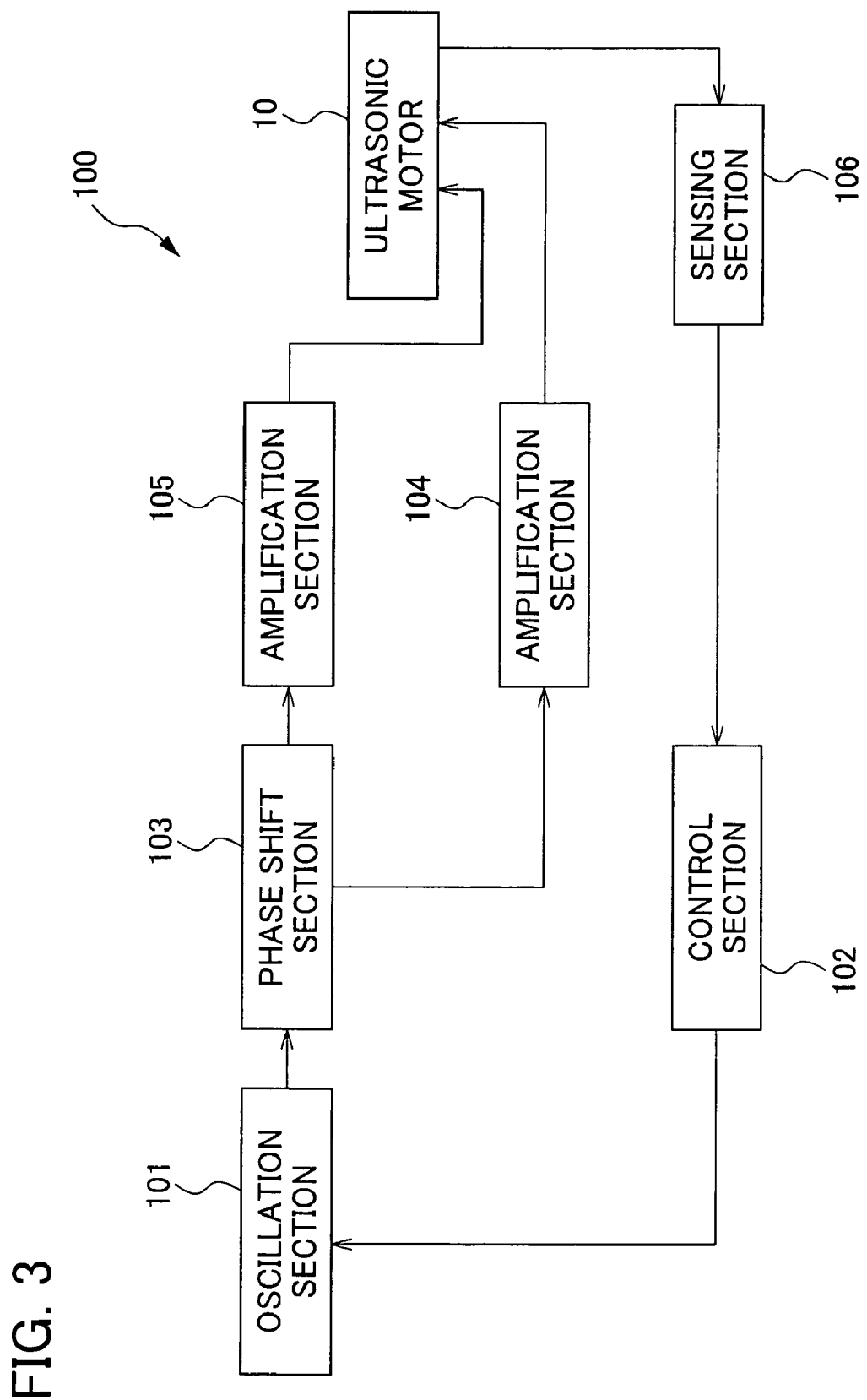
FIG. 3 is a block diagram explaining the driving device 100 of the ultrasonic wave motor 10 of the first embodiment.

FIG. 3 is a block diagram explaining the driving device 100 of the ultrasonic wave motor 10 of the present embodiment.

The oscillation section 101 is a section which generates a driving signal of a desired frequency according to instructions from a control section 102.

The phase shift section 103 is a section which divides the driving signal generated by the oscillation section 101 into two driving signals with a 90° phase difference.

The amplification sections 104 and 105 are sections which respectively boost the two driving signals divided by the phase shift section 103 to the desired voltage. The driving signals from the amplification sections 104 and 105 are transmitted to the ultrasonic wave motor 10, and progressive waves are generated at the vibrating element 11 by the application of these driving signals, and the moving element 15 is driven.

The detection section 106 is constituted of an optical encoder, magnetic encoder or the like, and is a section which detects the position and speed of the lens 7 driven by the driving of the moving element 15. In the present embodiment, the position and speed of the lens 7 are detected by detecting the position and speed of the cam tube 6.

The control section 102 is a section which controls the driving of the ultrasonic wave motor 10 based on driving instructions from the CPU, not shown in the drawings, provided in the camera body 2. The control section 102 receives a detection signal from the detection section 106, and based on its value, obtains the position information and speed information, and controls the driving frequency of the driving signal generated by the oscillation section 101 so as to set the position at the target position.

According to the constitution of the present embodiment, the driving device 100 of the ultrasonic wave motor 10 operates as follows.

First, the target position is transmitted to the control section 102. A driving signal is generated from the oscillation section 101, and two driving signals having a 90° phase difference are generated by the phase difference section 103 from this signal, which are amplified by the amplification sections 104 and 105 to the desired voltage.

The driving signals are applied to the piezoelectric body 13 of the ultrasonic wave motor 10 and the piezoelectric body is excited, and a fourth order bending vibration is generated at the elastic body 12 by this excitation. The piezoelectric body 13 is divided into the A phase and B phase, and the driving signals are respectively applied to the A phase and B phase. The fourth order bending vibration generated at the A phase and the fourth order bending vibration generated at the B phase have a spatial phase displacement of ¼ wavelength, and further, the A phase driving signal and the B phase driving signal have a 90° phase displacement, thus the two bending vibrations, compounded, form a four wave progressive wave.

An elliptical motion is generated at the wave crests of the progressive waves. Accordingly, the moving element 15 which pressure-contacts the driving face of the elastic body 12 is frictionally driven by these elliptical waves.

A detection section 106 such as an optical encoder or the like detects the position and speed of the cam tube 6 driven by the driving of the moving element 15, and transmits the same as electric pulses to the control section 102. The control section 102, based on this signal, can obtain the current position and current speed of the lens 7, and the driving frequency generated by the oscillation section 101 is controlled based on this position information, speed information, and the target position information.

Figure 4A:
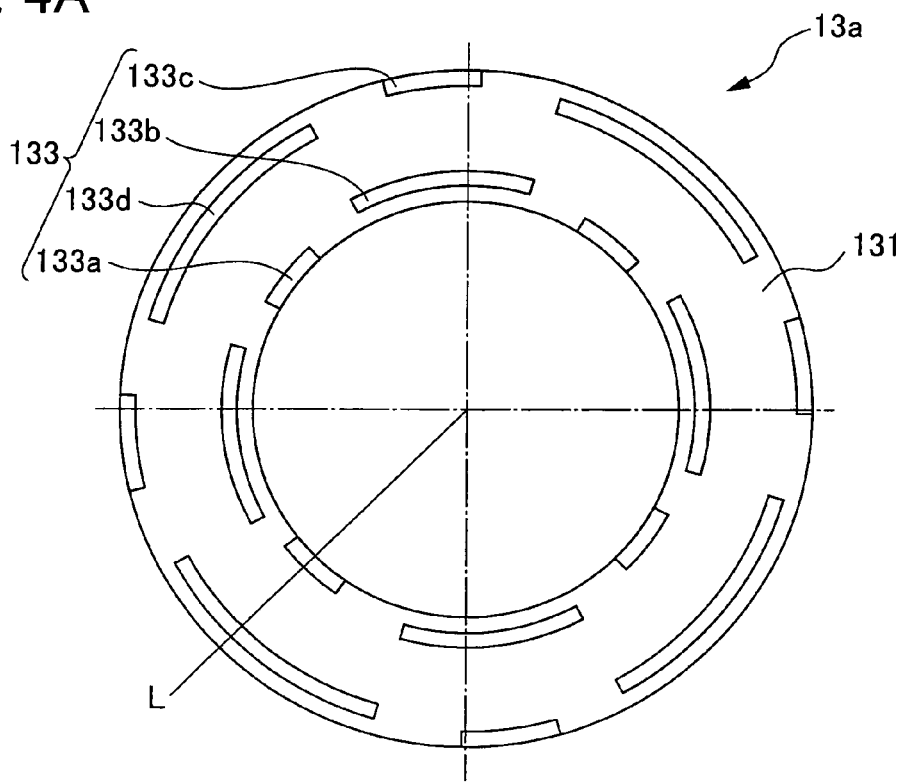
FIG. 4 is a drawing showing the piezoelectric body 13 of the first embodiment.
Figure 4B:
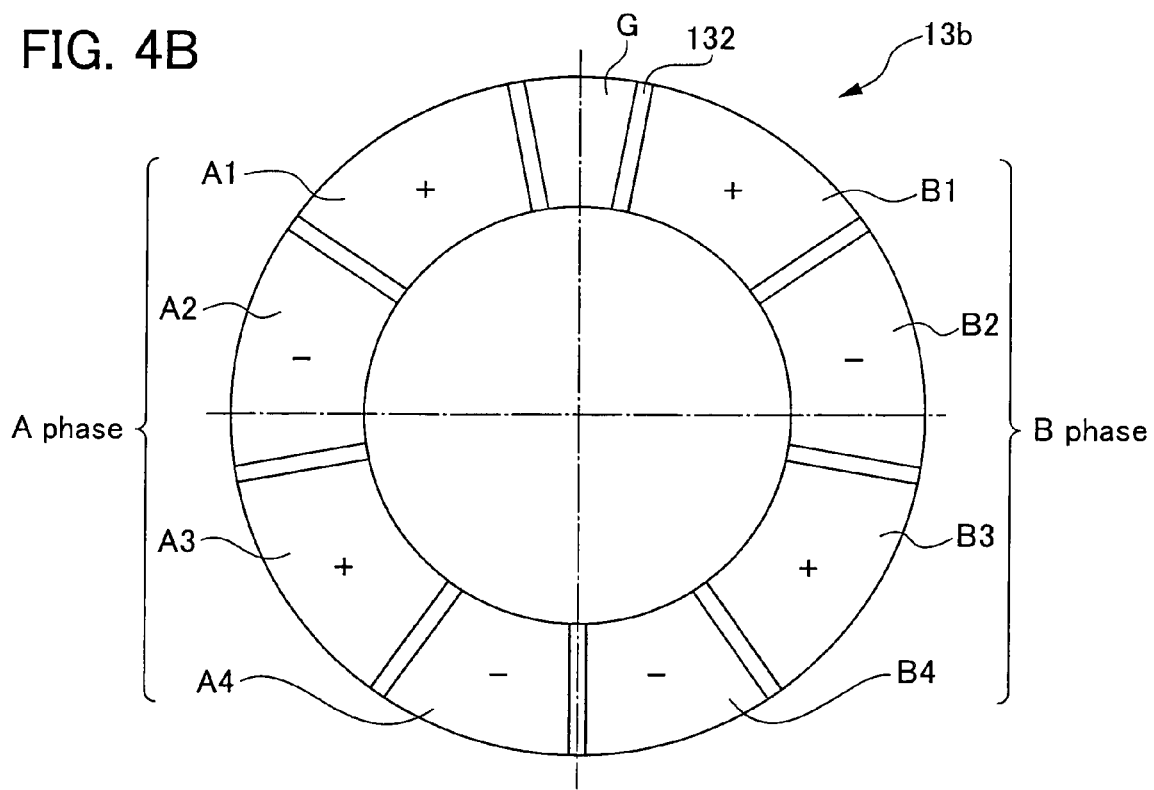

FIG. 4 is a drawing showing the piezoelectric body 13 of the first embodiment. FIG. 4A is a drawing of the joining face 13a of the piezoelectric body 13 jointed to the elastic body 12, seen from the side of the elastic body 12. FIG. 4B is a drawing of the face 13b on the opposite side of the joining face of the piezoelectric body 13 (below referred to as the other face) seen from the side of the gear member 20.

On the joining face 13a of the piezoelectric body 13 are formed the electrode portion 131 and joining strength improving portions 133. Further, on the other face 13b are formed the electrodes A1 to A4 and B1 to B4 to which the electric signals of the two phases A and B are input. At the portion of the ¼ wavelength opening between the A phase and the B phase, a ground G is provided. The electrode portion 131, as well as the electrodes A1 to A4 and B1 to B4, and the ground G are each formed by applying a silver paste by screen printing to the respective surfaces of the joining face 13a, and the other face 13b, of the piezoelectric body 13, and these are used for the polarizing process of the piezoelectric body 13.

At the other face 13b, between each of the electrodes A1 to A4, B1 to B4, and between the electrode A1 and the ground G, and between the ground G and the electrode B1, there is formed a substrate portion 132 where the surface of the substrate of the piezoelectric body 13 is exposed.

The joining strength improving portions 133 (133a, 133b, 133c, and 133d) formed on the joining face 13a of the piezoelectric body 13 are explained as follows.

The joining strength improving portions 133 are portions where the substrate of the piezoelectric body 13 is exposed, and have the function of improving the joining strength between the piezoelectric body 13 and the elastic body 12. The joining strength improving portions 133 are formed so that their measurements in the peripheral direction of the piezoelectric body 13 are longer than their measurements in the radial direction of the piezoelectric body 13.

The joining strength improving portions 133 are portions where the substrate of the piezoelectric body 13 is exposed, and have minute irregularities on their surfaces. Because of this, when joining the piezoelectric body 13 and elastic body 12, which is metallic, using an adhesive, the adhesive penetrates into the minute irregularities and as a result, an anchoring effect is obtained, and a strong joining strength can be obtained.

In the present embodiment, the joining strength improving portions 133, as shown in FIG. 4A, have four forms (133a, 133b, 133c, and 133d), and each is formed at four positions at approximately 90° rotational intervals centered about the center of the diameter of the piezoelectric body 13.

The joining strength improving portion 133a is formed adjoining the inner peripheral edge of the contact face 13a. The joining strength improving portion 133b is formed at the inner peripheral side (near the inner peripheral edge) of the joining face 13a, but does not adjoin the inner peripheral edge. The joining strength improving portion 133c is formed adjoining the outer peripheral edge of the joining face 13a. The joining strength improving portion 133d is formed at the outer peripheral side (near the outer peripheral edge) of the joining face 13a, but does not adjoin the outer peripheral edge.

As shown in FIG. 4A, at the outer peripheral side corresponding to the portion where the joining strength improving portion 133a is formed at the inner peripheral edge of the contact face 13a, the joining strength improving portion 133d is formed further towards the inner peripheral side than the outer peripheral edge. At the inner peripheral side corresponding to the portion where the joining strength improving portion 133c is formed at the outer peripheral edge of the of the joining face 13a, the joining strength improving portion 133b is formed further towards the outer peripheral side than the inner peripheral edge. By positioning the joining strength improving portions 133 in this way, for an imaginary straight line L extending in the radial direction of the piezoelectric body 13 on the joining face 13a, in any region of the joining face 13a, an electrode portion 131 will be formed on at least one of the outer peripheral edge and the inner peripheral edge contacted by this imaginary straight line L.

Further, in the present embodiment, the measurements in the radial direction of the piezoelectric body 13 of the joining strength improving portions 133a, 133b, 133c, and 133d are the same, but the measurements in the peripheral direction of the piezoelectric body 13 of the joining strength improving portions 133b and 133d are formed to be longer than for the joining strength improving portions 133a and 133c.

In the ultrasonic wave motor, if the joining strength between the piezoelectric body and the elastic body is weak, the efficiency of transmitting the expansion and contraction of the piezoelectric body to the elastic body is reduced, leading to a reduction in the driving performance. Accordingly, as explained above, by providing the joining strength improving portions 133, where the substrate is exposed, at the joining face 13a of the piezoelectric body 13, the joining strength is improved by the anchoring effect, and it is possible to improve the driving efficiency.

Further, the reason for forming the joining strength improving portions 133 such that their measurements in the peripheral direction of the piezoelectric body 13 are longer than their measurements in the radial direction, as shown in FIG. 4A, is as following. When transmitting the progressive wave to the elastic body 12 by expanding and contracting the piezoelectric body 13 according to a driving signal from the flexible printed circuit board 14, when viewed locally the piezoelectric body 13 bends, and a large shear stress is generated at the contact portions of the elastic body 12 and the piezoelectric body 13. Thus, the joining strength improving portions 133 are present in order to prevent the destruction or deformation of the adhesive layer at the contact section arising from this shear stress, and to transmit with certainty the excitation from the piezoelectric body 13 to the elastic body 12.

Furthermore, the reason for forming joining strength improving portions 133 at and near the inner peripheral edge and outer peripheral edge of the joining face 13a is as following. At and near the inner peripheral edge and outer peripheral edge of the joining face 13a, the shear stress of the joining face when the piezoelectric body expands and contracts according to the driving signal is even greater, therefore destruction or deformation of the adhesive layer could easily arise. To prevent these destruction or deformation, and to transmit with certainty the excitation from the piezoelectric body 13 to the elastic body 12, the joining strength improving portions 133 are formed at and near the inner peripheral edge and outer peripheral edge of the joining face 13a.

It is preferable to form electrodes at the region facing the region of the joining strength improving portions 133 of the other face 13b. The reason for this is explained below.

Figure 6A:
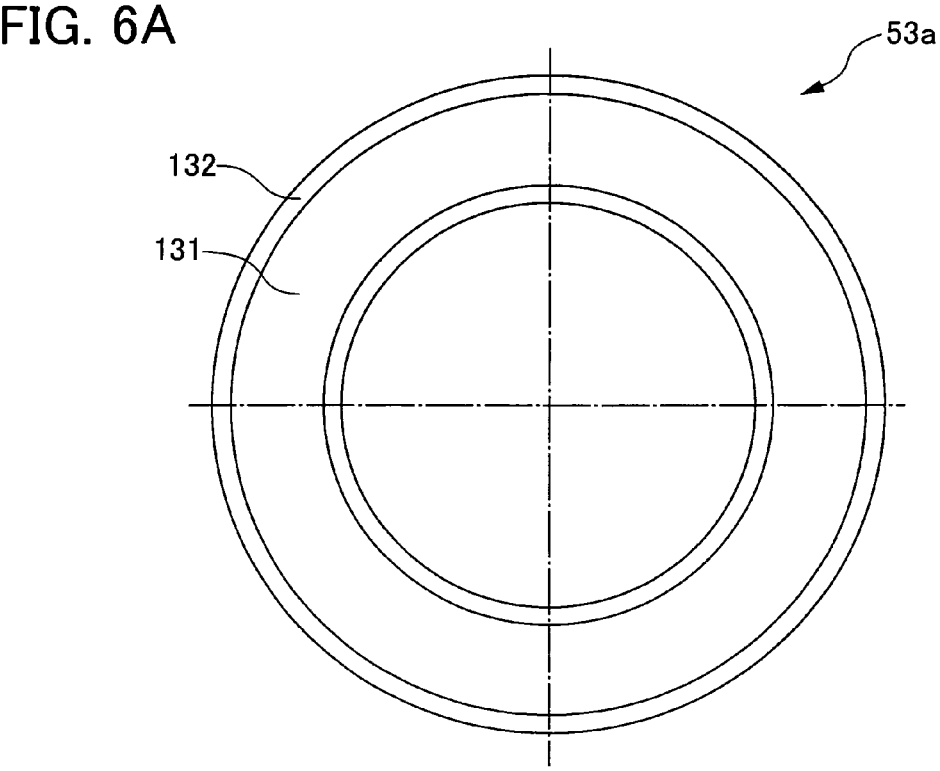
FIG. 6 is a drawing showing the piezoelectric body 53 of the ultrasonic wave motor of Comparative Example 1.
Figure 6B:
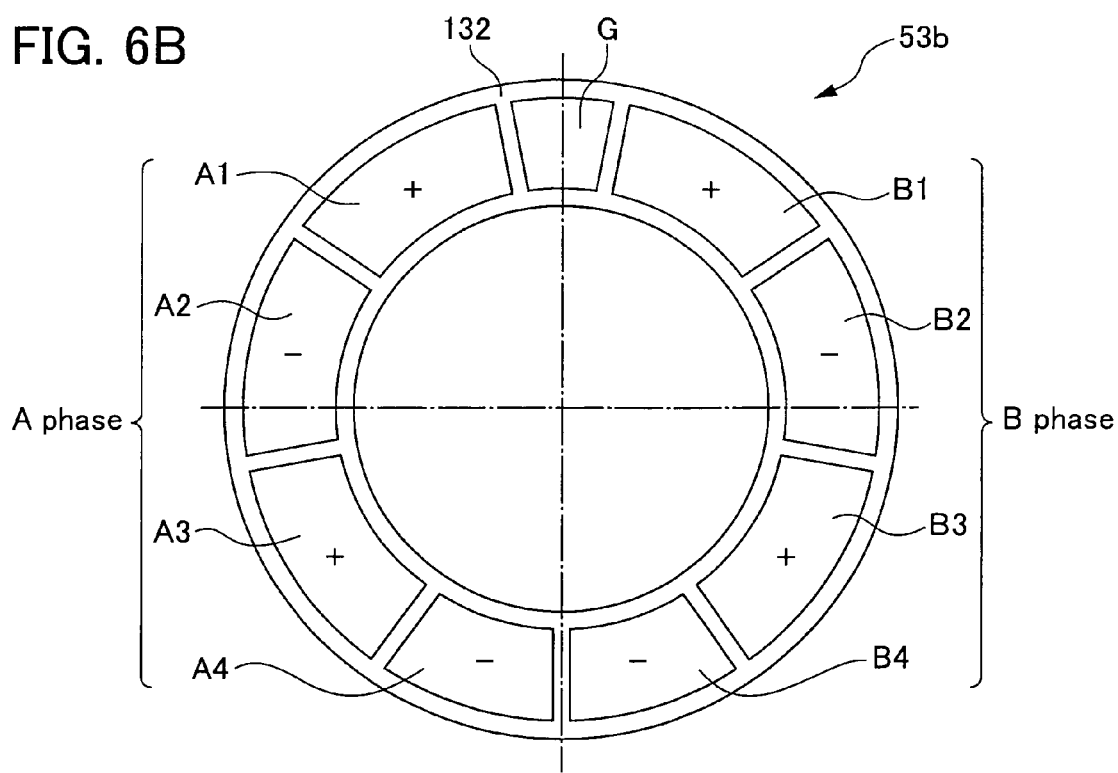

In the prior art, when screen printing or the like to form the electrode portions at the surface of the piezoelectric body, for ease of manufacture, as shown in FIGS. 6A and 6B explained later, a substrate portion 132 where the substrate of the piezoelectric body is exposed is formed adjoining the inner peripheral edge and outer peripheral edge of the electrode portion 131 and electrodes A1 to A4 and B1 to B4 of the piezoelectric body 53.

Figure 5A:
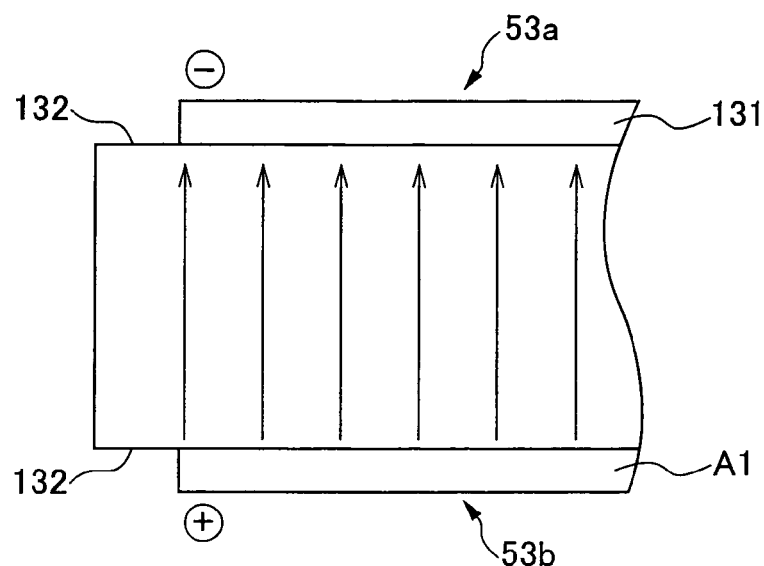
FIG. 5 is a drawing showing the polarized state of the piezoelectric body.
Figure 5B:
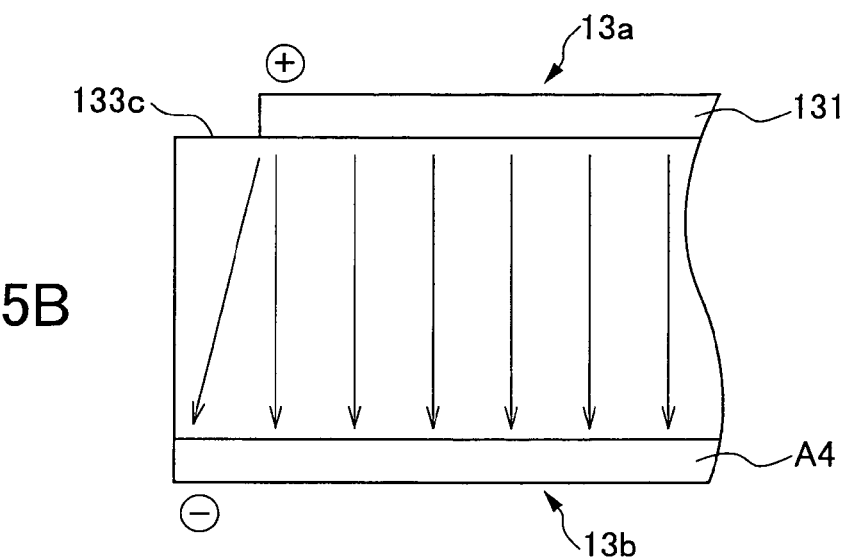
Figure 5C:
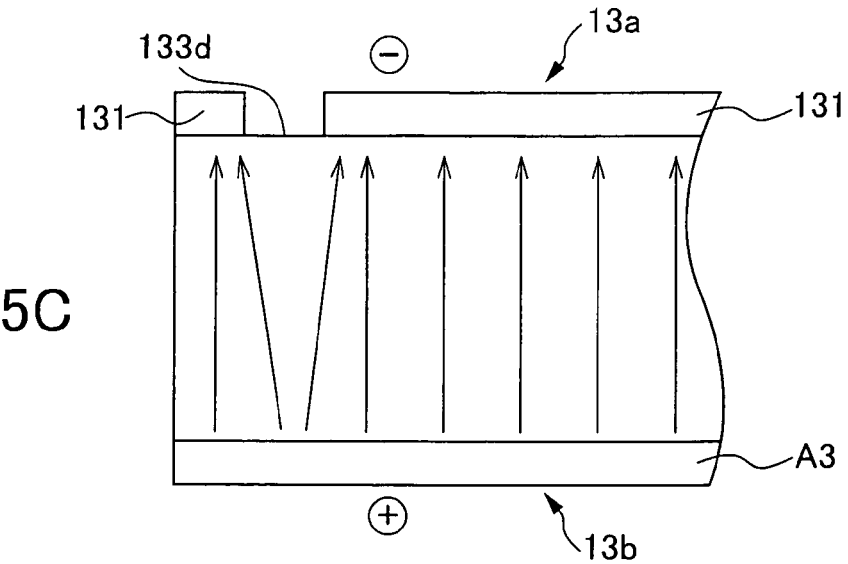

FIG. 5 is a drawing showing the state of polarization of the piezoelectric body. FIGS. 5A to 5C show an enlargement of a cross section, sectioned in the direction parallel to the radial direction and further, parallel to the normal line of the joining face, of the outer peripheral edge of the piezoelectric body. Further, in FIGS. 5A to 5C the side of the joining face is upwards in the drawings, but this orientation is not a particular limitation. Further, FIGS. 5A to 5C show the state of the polarization of the outer peripheral edges, but the inner peripheral edges are similar.

FIG. 5A is a cross sectional drawing of the vicinity of the outer peripheral edge of the piezoelectric body 53 of the prior art explained later and shown in FIGS. 6A and 6B, a substrate portion 132 is formed adjoining the outer peripheral edge of the joining face 53a and the other face 53b. FIGS. 5B and 5C are cross sectional drawings of the vicinity of the outer peripheral edge of the piezoelectric body 13 of the present embodiment. FIG. 5B is a cross sectional drawing of the portion where the joining strength improving portion 133c is formed; and the joining strength improving portion 133c is formed adjoining the outer peripheral edge of the contact face 13a, and the electrode portion 131 is formed at the outer peripheral edge of the other face 13b. FIG. 5C is a cross sectional drawing of the portion where the joining strength improving portion 133d is formed, and the electrode portion 131 is formed at the outer peripheral edge of the contact face 13a and the other face 13b.

The progressive waves generated at the elastic body are obtained by compounding the standing waves of the two bending vibrations generated by the excitation of the piezoelectric body, and the bending vibrations of these standing waves are generated by using the expanding and contracting force from the application of a voltage to the piezoelectric body (unimorph effect).

In a vibration actuator, it is ideal from the viewpoint of obtaining favorable driving performance that the width in the radial direction of a portion where a polarizing process is effectively applied, and progressive waves are generated when a driving voltage is applied, be equal to or more than the width in the radial direction of the electrode portion of the piezoelectric body.

However, because the electrode portion is not formed at the substrate portion, it cannot be polarized, and the surface area to which a driving signal can be applied is reduced by the surface area of the substrate portion. Because of this, as shown in FIG. 5A, an ultrasonic wave motor using the piezoelectric body 53 provided with the substrate portion 132 at the inner peripheral edge and outer peripheral edge of the joining face 53a and other face 53b of the piezoelectric body 53 are not polarized in the region where the substrate portion 132 is formed, and therefore the driving efficiency is reduced.

In contrast, in the present embodiment, as shown in FIG. 5B, an electrode A4 is formed at the region of the other face 13b facing the joining strength improving portion 133c and thus, when carrying out the polarization process, most of the region of the piezoelectric body 13 corresponding to the region of the joining strength improving portion 133c is polarized.

Further, in the same way, as shown in FIG. 5C, for the section where the joining strength improving portion 133d is formed further towards the inner peripheral side in the radial direction of the outer peripheral edge of the joining face 13a, electrode A3 is formed at the region facing the joining strength improving portion 133d of the other face 13b, and thus, most of the region of the piezoelectric body 13 corresponding to the region of the joining strength improving portion 133d is polarized.

Accordingly, when forming joining strength improving portions 133 where the substrate of the piezoelectric body 13 is exposed on the joining face 13a, as shown in FIGS. 5B and 5C, by forming an electrode portion 131 at the region of the other face 13b facing the region of the joining strength improving portion 133, it is possible to obtain the desired joining strength without reducing the driving efficiency.

The ultrasonic wave motors of the Comparative Examples 1 and 2 were prepared, and their driving performance was evaluated when driven under the same conditions as the ultrasonic wave motor 10 of the present embodiment. The ultrasonic wave motors of Comparative Examples 1 and 2 have approximately the same form as the ultrasonic wave motor 10 of the present embodiment except for a difference in the form of the joining face, thus the same reference numbers are used for the portions having the same functions as the ultrasonic wave motor 10 of the present embodiment, and overlapping explanations are omitted.

FIG. 6 is a drawing showing the piezoelectric body 53 of the ultrasonic wave motor of Comparative Example 1. FIG. 6A shows the joining face 53a of the piezoelectric body 53, and FIG. 6B shows the other face 53b.

The ultrasonic wave motor of the Comparative Example 1 is an ultrasonic wave motor using an ordinary piezoelectric body of the prior art where a substrate portion 132 is formed at the inner peripheral edge and outer peripheral edge of the joining face 53a and other face 53b of the piezoelectric body 53.

Figure 7A:
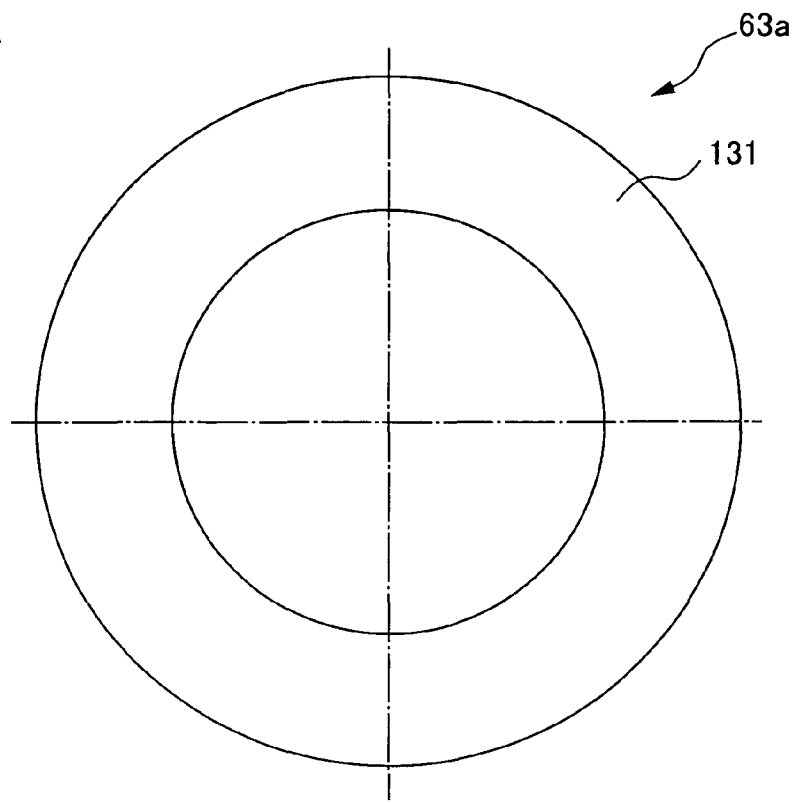
FIG. 7 is a drawing showing the piezoelectric body 63 of the ultrasonic wave motor of Comparative Example 2.
Figure 7B:
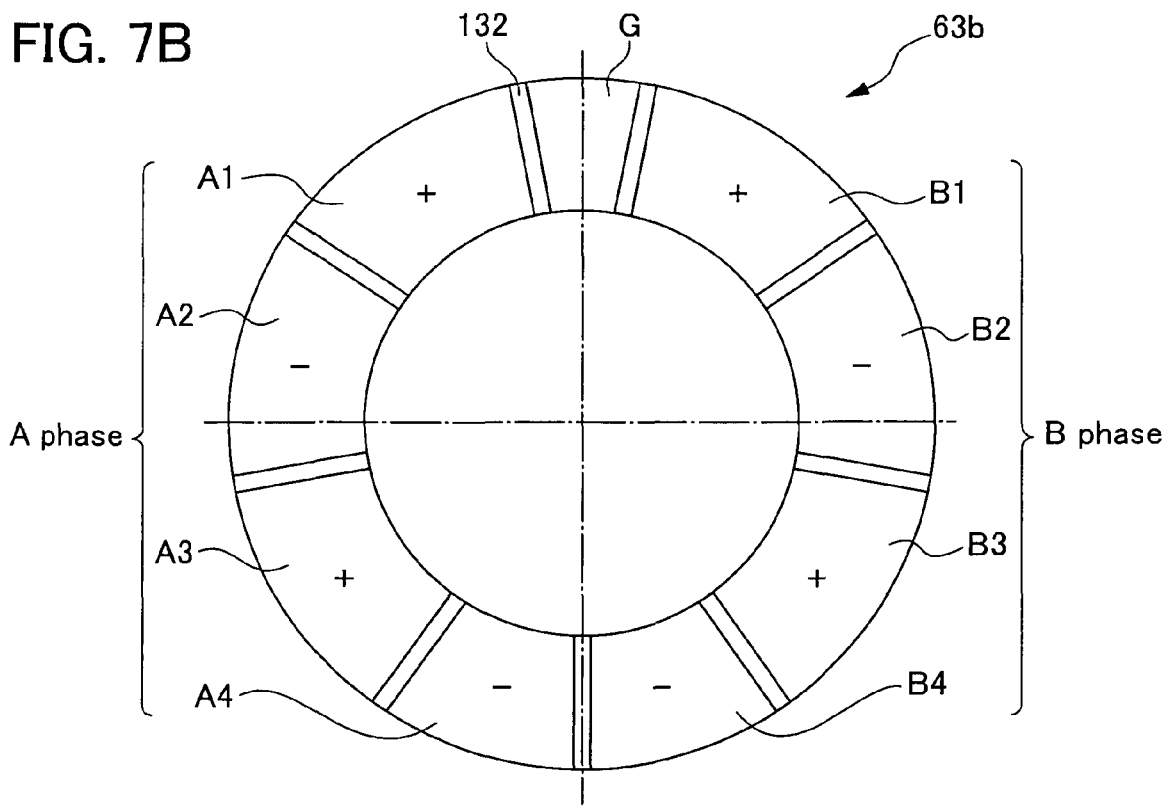

FIG. 7 is a drawing showing the piezoelectric body 63 of the ultrasonic wave motor of Comparative Example 2. FIG. 7A shows the joining face 63a of the piezoelectric body 63, and FIG. 7B shows the other face 63b.

The ultrasonic wave motor of Comparative Example 2 has the electrode portion 131 formed on the whole face of the joining face 63a. Further, on the other face 63b, a substrate portion 132 is formed between each of the electrodes A1 to A4 and B1 to B4, but the substrate portion 132 is not formed at the inner peripheral edge or outer peripheral edge.

TABLE 1

| | Resonance Impedance | Rated Driving Input |
|---|---|---|
| First Embodiment | 120 Ω | 510 mW |
| Comparative Example 1 | 115 Ω | 530 mW |
| Comparative Example 2 | 210 Ω | 650 mW |

Table 1 is a table showing the results of the evaluation of the driving performance of the ultrasonic wave motor 10 of the first embodiment, and the ultrasonic wave motors of Comparative Examples 1 and 2.

In Table 1, the "resonance impedance" is the minimum value of the frequency-impedance characteristic. The resonance impedance can be considered one of the indicators showing the joining strength of the piezoelectric body and the elastic body, and when the conditions other than the joining strength are the same, a higher resonance impedance indicates a weaker joining strength.

Further, the "rated driving input" is the electric power input to the ultrasonic wave motor when driving a rated load ($0.39 \times 10^{-2}$ N·m ($\approx$40 gf·cm)) at a rated rotational speed (300 min$^{-1}$), and a lower rated driving power indicates a more favorable driving efficiency.

From the results shown in Table 1, concerning the resonance impedance, the ultrasonic wave motor 10 of the first embodiment and the ultrasonic wave motor of Comparative Example 1 are approximately the same, but the ultrasonic wave motor of Comparative Example 2 has a resonance impedance of about 1.8 times higher than the other two ultrasonic wave motors.

This means that, in the ultrasonic wave motor of Comparative Example 2, by forming an electrode portion 131 on the whole face of the joining face 63a of the piezoelectric body 63, and not forming a substrate portion 132, the joining strength between the piezoelectric body 63 and the elastic body 12 is reduced.

Comparing the rated driving input of the ultrasonic wave motor of Comparative Example 2 with the other two ultrasonic wave motors, the value is greater by 120 mW to 140 mW. This is because the joining strength is weak and thus the excitation of the piezoelectric body 63 cannot be efficiently transmitted to the elastic body 12, thus showing a reduction in the driving efficiency.

Further, the ultrasonic wave motor 10 of the first embodiment has a value of the rated driving input which is 20 mW smaller than the ultrasonic wave motor of Comparative Example 1. This shows as followings. The ultrasonic wave motor 10 of the first embodiment has the joining strength improving portions 133 provided on the joining face 13a as shown in FIG. 4A. Therefore it is possible to obtain an effect similar to that of increasing the surface area of the piezoelectric body where the progressive waves are actually generated, while maintaining approximately the same joining strength as the ultrasonic wave motor of Comparative Example 1 by forming the electrode portion 131 and the electrodes A1 to A4 and B1 to B4 on the inner peripheral edge and outer peripheral edge of the piezoelectric body 13. Further, as shown in FIGS. 5B and 5C, at most of the region of the other face 133b facing the region of the joining strength improving portions 133, electrodes A1 to A4 and B1 to B4 are formed. Thus by increasing the region where progressive waves are generated by increasing the region where the piezoelectric body 13 is polarized, the efficiency of transmitting the expansion and contraction of the piezoelectric body 13 to the elastic body 12 can be increased, thereby showing an increase in the driving efficiency of the ultrasonic wave motor 10.

Therefore, according to the present embodiment, it is possible to miniaturize the ultrasonic wave motor while maintaining a good driving efficiency.

Second Embodiment

Figure 8A:
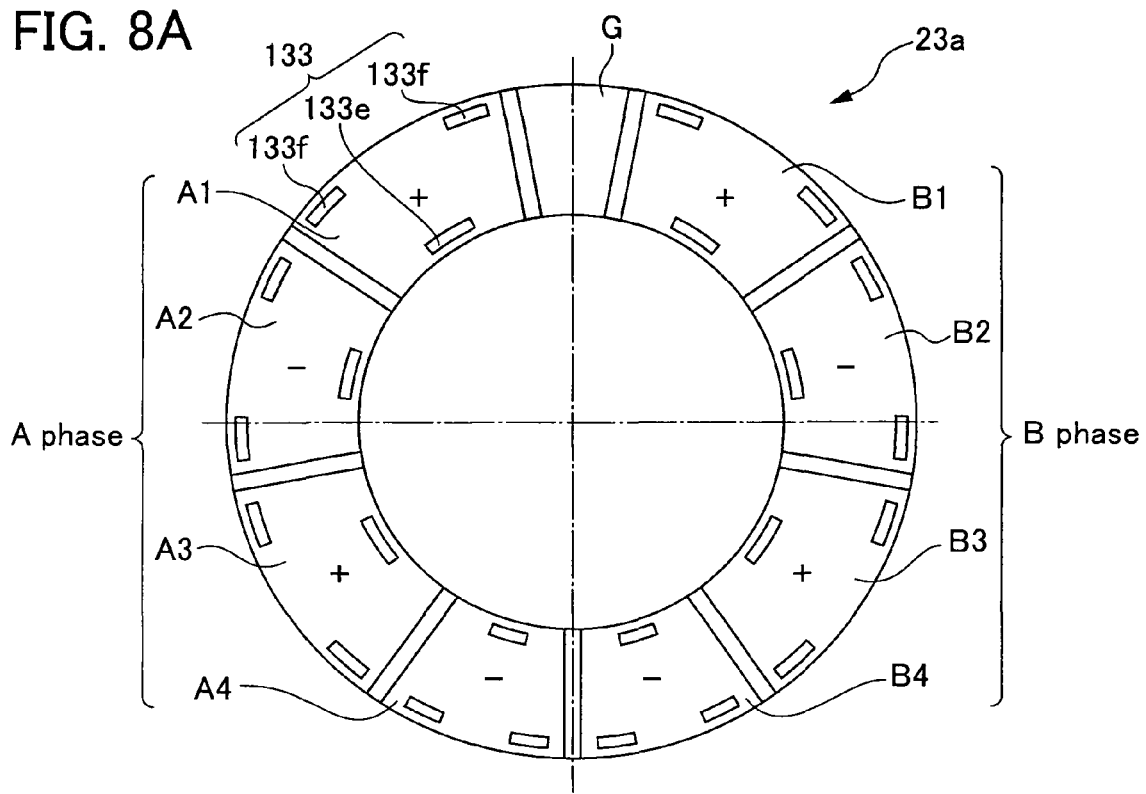
FIG. 8 is a drawing showing the piezoelectric body 23 of the ultrasonic wave motor of the second embodiment.
Figure 8B:
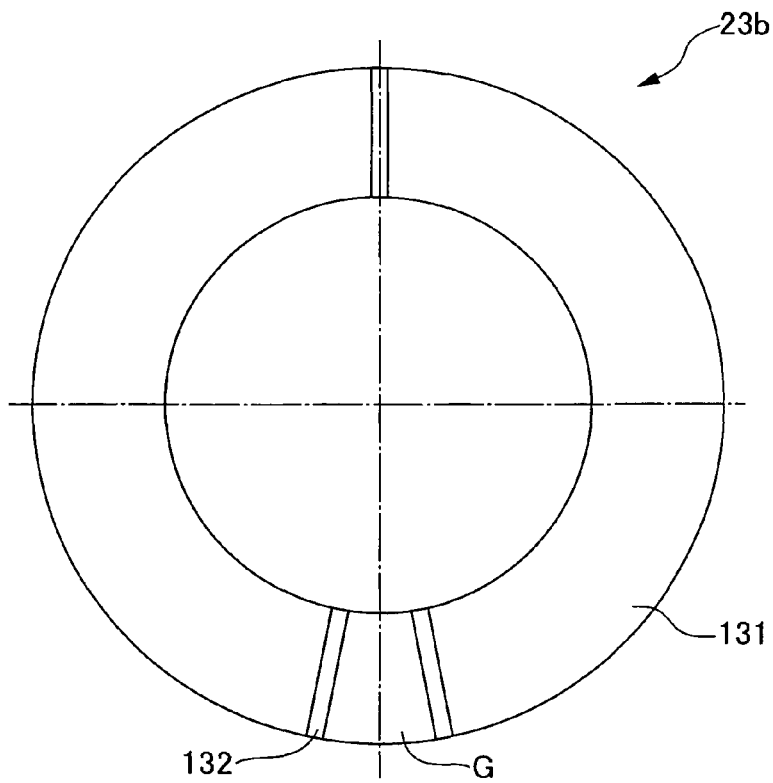

FIG. 8 is a drawing showing the piezoelectric body 23 of the ultrasonic wave motor of the second embodiment. FIG. 8A shows the appearance of the joining face 23a as seen from the side of the elastic body 12. FIG. 8B shows the appearance of the other face 22b as seen from the side of the gear member 20.

The ultrasonic wave motor of the second embodiment has approximately the same form as the ultrasonic wave motor 10 of the first embodiment, other than a difference in the form and the like of the joining face 23a of the piezoelectric body 23. Accordingly, in the second embodiment, parts having the same function as in the ultrasonic wave motor 10 of the first embodiment are given the same reference numbers and overlapping explanations are omitted. Further, this is also the case for the later explained third and fourth embodiments.

As shown in FIG. 8A, in the ultrasonic wave motor of the second embodiment, the electrodes A1 to A4 and B1 to B4 to which the driving signals of the A phase and B phase are applied, and the ground G, are formed on the joining face 23a of the piezoelectric body 23. Further, as shown in FIG. 8B, the electrode portion 131 is formed on approximately the whole face of the other face 23b, and a substrate portion 132 is formed between each of the areas corresponding to the ground G, the A phase and the B phase.

In the ultrasonic wave motor of the present embodiment, the substrate portion 132 is formed between each of the electrodes A1 to A4 and B1 to B4 of the joining face 23a. For the distortion of the piezoelectric body 23 when expanding and contracting, the distortion between each of the electrodes A1 to A4 and B1 to B4 is very small compared to the distortion of the region inside each electrode A1 to A4 and B1 to B4, and makes almost no contribution to the progressive wave. Accordingly, the substrate portion 132 provided between each of the electrodes A1 to A4 and B1 to B4 has little effect for improving the joining strength.

The joining strength improving portions 133 (133e, 133f) are formed near the inner peripheral edge (133e) and outer peripheral edge (133f) inside the regions of the electrodes A1 to A4 and B1 to B4, but do not adjoin the inner peripheral edge or outer peripheral edge. As stated above, the distortion when the piezoelectric body 23 expands and contracts is large inside the region of each electrode A1 to A4 and B1 to B4, thus a larger effect of improving the joining strength is expected from forming the joining strength improving portions 133 inside the region of each of the electrodes A1 to A4 and B1 to B4. Further, the joining strength improving portions 133 are formed in each electrode alternating on the inner peripheral side (133e) and outer peripheral side (133f) along the peripheral direction of the piezoelectric body 23.

According to the present embodiment, joining strength improving portions 133 are formed at each of the electrodes which are the base for the generation of the progressive waves at the elastic body 12, thus the efficiency of transmitting the excitation of the piezoelectric body 23 to the elastic body 12 can be improved, and the driving performance of the ultrasonic wave motor can be improved.

Third Embodiment

Figure 9A:
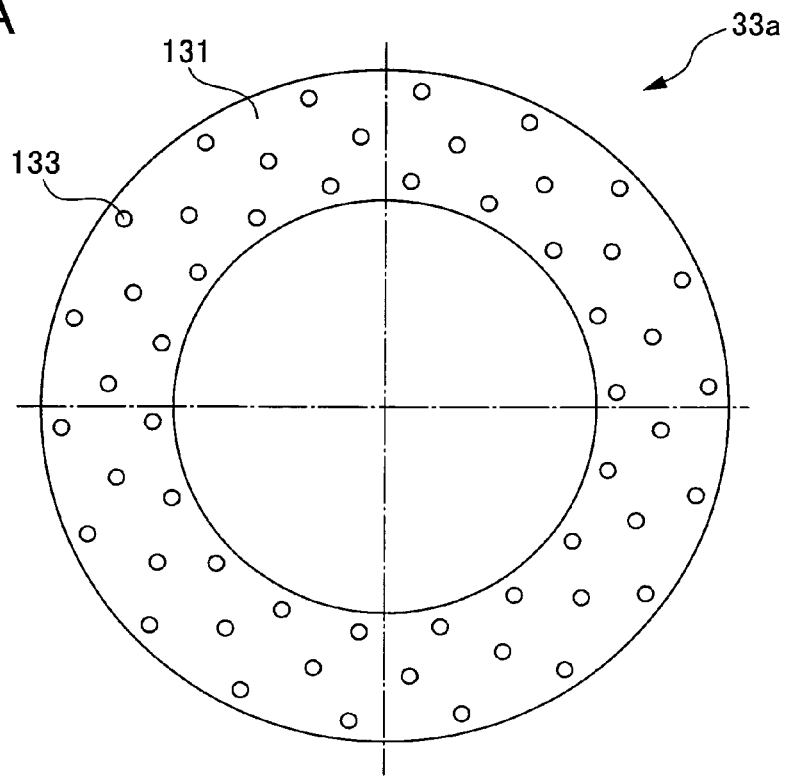
FIG. 9 is a drawing showing the piezoelectric body 33 of the ultrasonic wave motor of the third embodiment.
Figure 9B:
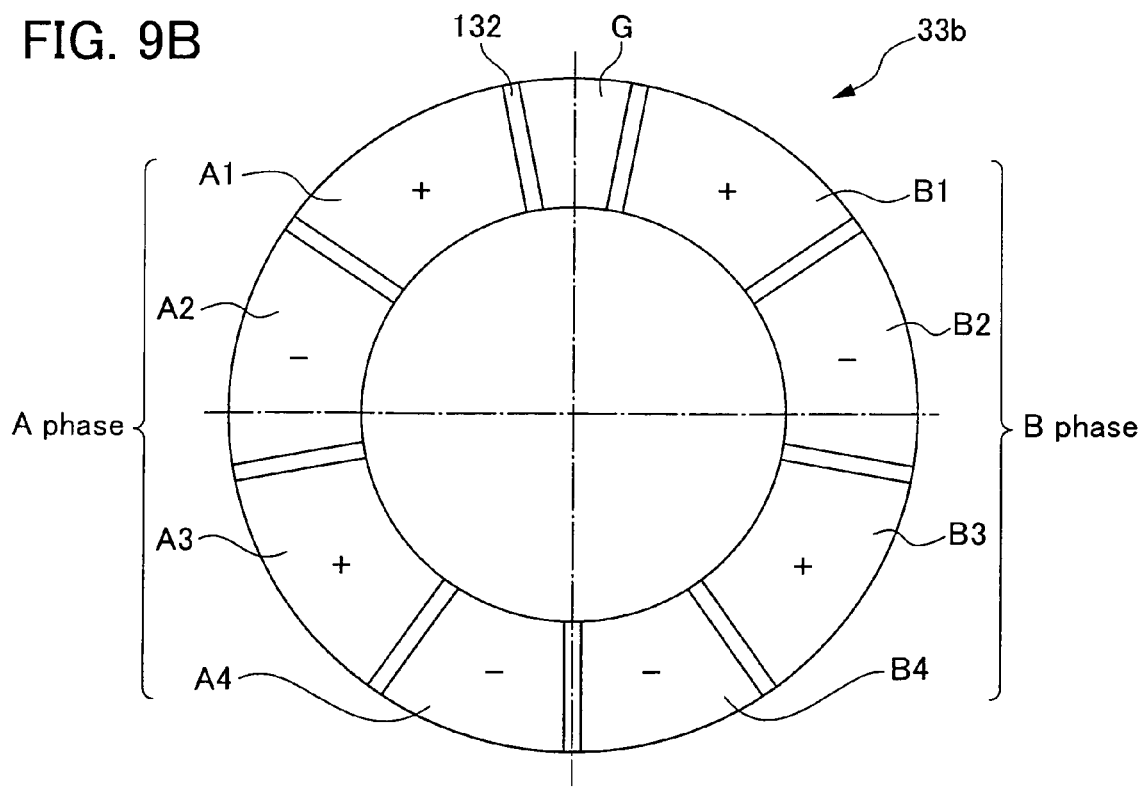

FIG. 9 is a drawing showing the piezoelectric body 33 of the ultrasonic wave motor of the third embodiment. FIG. 9A is a drawing of the joining face 33a of the piezoelectric body 33 as seen from the side of the elastic body 12, and FIG. 9B is a drawing of the other face 33b seen from the side of the gear member 20.

The ultrasonic wave motor of the third embodiment has approximately the same form as the ultrasonic wave motor 10 of the first embodiment, except for a difference in the form and position of the joining strength improving portions 133 formed on the joining face 33a of the piezoelectric body 33.

As shown in FIG. 9A, the electrode portion 131 is formed at the joining face 33a with the elastic body 12 of the piezoelectric body 33, and the approximately circular joining strength improving portions 133 are positioned randomly inside the region of the electrode portion 131.

Further, in the present embodiment, an example of the joining strength improving portions 133 having an approximately circular shape is shown, but this is not a limitation and for example, they can also be rectangular or hexagonal polygons, without any particular limitations.

According to the present embodiment, there is no need for positioning when forming the electrode portion 131 and the joining strength improving portions 133 on the joining face 133, thus the manufacture becomes easy, and the production costs can be restrained.

Fourth Embodiment

Figure 10A:
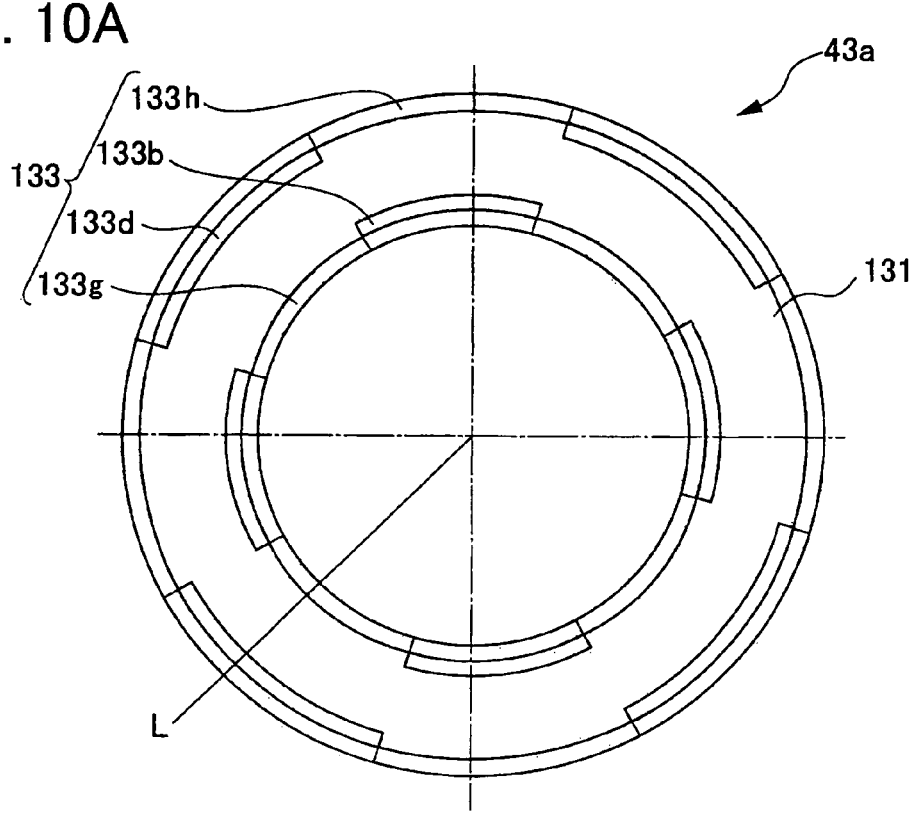
FIG. 10 is a drawing showing the piezoelectric body 43 of the ultrasonic wave motor of the fourth embodiment.
Figure 10B:
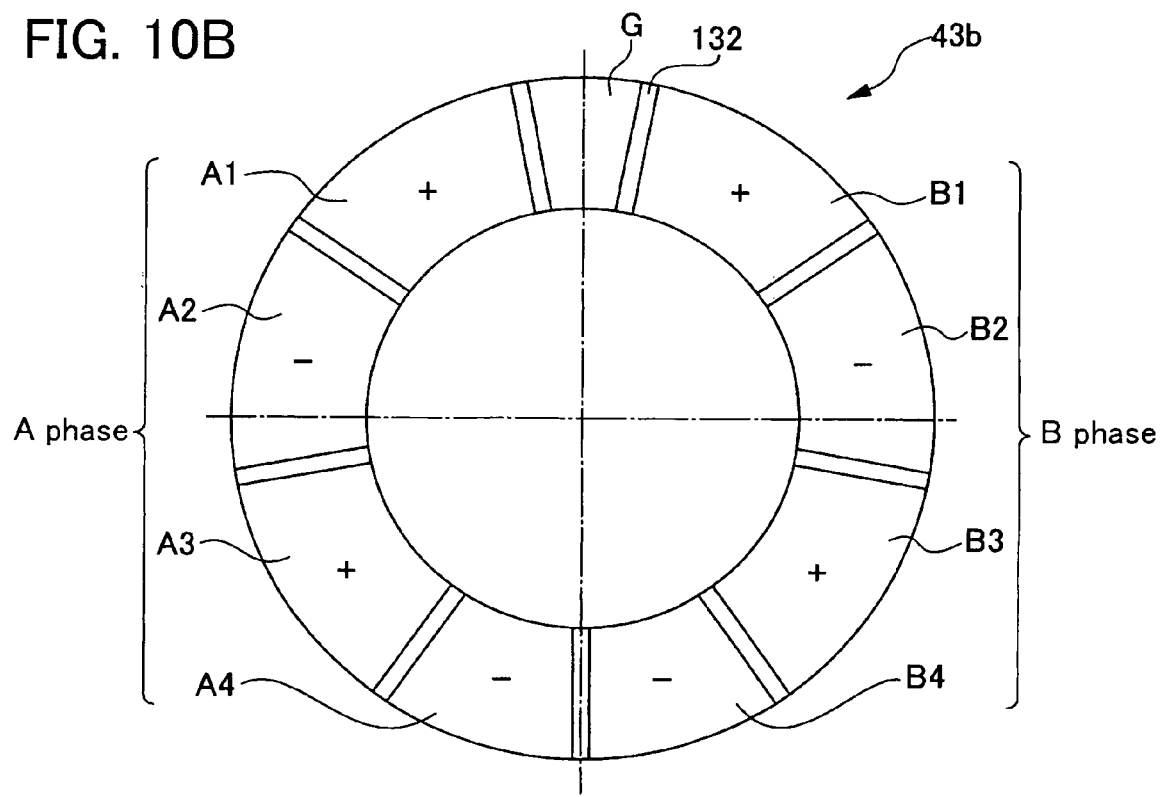

FIG. 10 is a drawing showing the piezoelectric body 43 of the ultrasonic wave motor of the fourth embodiment. FIG. 10A is a drawing of the joining face 43a seen from the side of the elastic body 12, and FIG. 10B is a drawing of the other face 43b seen from the side of the gear member 20.

The ultrasonic wave motor of the fourth embodiment has approximately the same form as the ultrasonic wave motor 10 of the first embodiment, except for a difference in the form of the joining strength improving portions 133 formed on the joining face 43a of the piezoelectric body 43. The sum total of the surface area of the joining strength improving portions 133 of the fourth embodiment is larger than the sum total of the surface area of the joining strength improving portions of the first embodiment. Further, the sum total of the surface area of the joining strength improving portions 133 of the fourth embodiment is about the same as the surface area of the substrate portion 132 formed on the joining face 53a in Comparative Example 1.

As shown in FIG. 10A, the joining strength improving portions 133b and 133d are equivalent to the those of the first embodiment (FIG. 4), but the joining strength improving portions 133g and 133h have a greater length in the peripheral direction than the joining strength improving portions 133a and 133c of the first embodiment. Further, the joining strength improving portion 133 g extends to the edge in the peripheral direction of the joining strength improving portion 133b which it adjoins in the peripheral direction, and the joining strength improving portion 133h extends to the edge in the peripheral direction of the joining strength improving portion 133d which it adjoins in the peripheral direction.

In the present embodiment, in the same way as in the first embodiment, when an imaginary straight line L is extended in the radial direction of the piezoelectric body 43 on the joining face 43a, in any region of the joining face 43a, an electrode is formed at either one of the outer peripheral edge or the inner peripheral edge contacting the imaginary straight line L. Further, unlike the first embodiment, in the present embodiment, there is no region where an electrode portion is formed at both the outer peripheral edge and the inner peripheral edge contacting the imaginary straight line L.

According to the present embodiment, compared to the first embodiment, the length of the joining strength improving portions 133 g and 133h has been lengthened, thus the sum total of the surface area of the joining strength improving portions 133 is increased, and the joining strength is improved.

Modifications

Without being limited to the above embodiments, many modifications and variations are possible, and these also fall within the scope of the present invention.

(1) In the first embodiment, third embodiment and fourth embodiment, the electrodes A1 to A4 and B1 to B4 to which the driving signal is input are formed on the opposite side of the joining face, while the second embodiment shows an example where the electrodes A1 to A4 and B1 to B4 are formed on the joining face, but in the first embodiment, third embodiment and fourth embodiment the electrodes A1 to A4 and B1 to B4 can be formed on the joining face, and in the second embodiment, the electrodes A1 to A4 and B1 to B4 can be formed on the face on the opposite side of the joining face.

(2) In each of the embodiments, the ultrasonic wave motor is shown by an example where it is used for driving a lens during the focusing operation, but this is not a limitation, and for example, it can also be an ultrasonic wave motor used for driving during the zooming operation of a lens.

(3) In each of the embodiments, an explanation was given for an example of an ultrasonic wave motor using vibrations in the ultrasonic wave region, but this is not a limitation, and it can be applied to a vibration actuator using vibrations outside of the ultrasonic wave region.

(4) In each of the embodiments, an explanation was given for the example of an ultrasonic wave motor where a moving element is rotationally driven, but this is not a limitation, and it can be applied to a vibration actuator of a linear type where a moving element is driven rectilinearly.

(5) In each of the embodiments, the ultrasonic wave motor was shown by an example where it is disposed in a camera, but this is not a limitation, and it can also be used as the driving section of a photocopy machine, or the driving section in a steering wheel tilting device or head rest of an automobile.

Further, each of the embodiments and modifications can be appropriately combined, but detailed explanations are omitted. Further, the present invention is not limited by the above embodiments.

The invention claimed is:

1. A vibration actuator comprising:
   an electromechanical conversion element which is excited by a driving signal;
   an elastic body to which the electromechanical conversion element is jointed, and on a driving face of which, vibration waves are generated by the excitation; and
   a relative moving element which is pressure-contacted with the driving face of the elastic body, and which is driven by the vibration waves, wherein:
   a joining face of the electromechanical conversion element which is joined to the elastic body has an electrode portion where an electrode is formed, and a joining strength improving portion which improves a joining strength between the elastic body and the electromechanical conversion element, and
   the electrode portion is formed on at least one of two edge portions of the joining face, an imaginary straight line passes through the two edge portions, the imaginary straight line passing through the joining strength improving portion and being orthogonal to a relative moving direction in which the elastic body and the relative moving element move relative to each other.

2. The vibration actuator according to claim 1, wherein:
   the joining strength improving portion is formed at different positions with respect to at least one of the relative moving direction on the two edge portions and in a vicinity of the two edge portions.

3. The vibration actuator according to claim 1, wherein:
   the joining strength improving portion has a dimension greater in the relative moving direction than in a direction along the imaginary straight line.

4. The vibration actuator according to claim 1, wherein:
   the joining strength improving portion is formed on an other of the two edge portions of the joining face through which the imaginary straight line passes.

5. The vibration actuator according to claim 1, wherein:
   the joining strength improving portion is randomly positioned on the joining face.

6. The vibration actuator according to claim 1, wherein:
   the electrode portion is formed at a section on an opposite side of the joining face, the section being aligned with the joining strength improving portion on the joining face of the electromechanical conversion element.

7. The vibration actuator according to claim 1, wherein:
   the electrode portion is not formed, and a substrate of the electromechanical conversion element is exposed on the joining strength improving portion.

8. A lens barrel provided with the vibration actuator according to claim 1.

9. A camera provided with the vibration actuator according to claim 1.

* * * * *